United States Patent
Matsui et al.

(10) Patent No.: US 9,279,200 B2
(45) Date of Patent: Mar. 8, 2016

(54) BASE FABRIC FOR AIR BAG WHICH HARDLY CAUSES "BOTTOMING" UPON COLLISION

(71) Applicant: TOYOBO CO., LTD., Osaka-shi, Osaka (JP)

(72) Inventors: Yoshihiro Matsui, Otsu (JP); Toshio Owari, Tsuruga (JP); Shingo Sogabe, Tsuruga (JP); Miho Yamamoto, Otsu (JP); Yusuke Kojyo, Otsu (JP); Hirokazu Nishimura, Otsu (JP)

(73) Assignee: TOYOBO CO., LTD., Osaka-shi (JP)

( * ) Notice: Subject to any disclaimer, the term of this patent is extended or adjusted under 35 U.S.C. 154(b) by 0 days.

(21) Appl. No.: 14/394,404

(22) PCT Filed: May 8, 2013

(86) PCT No.: PCT/JP2013/062897
§ 371 (c)(1),
(2) Date: Oct. 14, 2014

(87) PCT Pub. No.: WO2013/168728
PCT Pub. Date: Nov. 14, 2013

(65) Prior Publication Data
US 2015/0084319 A1    Mar. 26, 2015

(30) Foreign Application Priority Data
May 11, 2012  (JP) ................................. 2012-109449

(51) Int. Cl.
*D03D 1/02*   (2006.01)
*B60R 21/235* (2006.01)
(Continued)

(52) U.S. Cl.
CPC ............... *D03D 1/02* (2013.01); *B60R 21/235* (2013.01); *B60R 21/239* (2013.01);
(Continued)

(58) Field of Classification Search
CPC .. D03D 1/02; D10B 2505/124; B60R 21/235; B60R 2021/23509; B60R 2021/23504
See application file for complete search history.

(56) References Cited

U.S. PATENT DOCUMENTS

| | | | | |
|---|---|---|---|---|
| 6,022,817 A | * | 2/2000 | Lewis et al. | 442/189 |
| RE38,769 E | * | 8/2005 | Keshavaraj et al. | 26/18.6 |
| 2006/0252322 A1 | * | 11/2006 | DeBenedictis et al. | 442/59 |

FOREIGN PATENT DOCUMENTS

| | | |
|---|---|---|
| JP | 09-209234 A | 8/1997 |
| JP | 2001-214373 A | 8/2001 |

(Continued)

OTHER PUBLICATIONS

English translation of the International Preliminary Report on Patentability (Form PCT/IB/338) of International Application No. PCT/JP2013/062897 mailed Nov. 20, 2014 and Written Opinion (Form PCT/ISA/237) mailed Aug. 20, 2013 (5 pages).

(Continued)

*Primary Examiner* — Keith Frisby
(74) *Attorney, Agent, or Firm* — Westerman, Hattori, Daniels & Adrian, LLP

(57) ABSTRACT

There is disclosed a non-coated base fabric for air bag characterized in that maximum value of inner pressure of a woven fabric in measurement of dynamic air permeability at 50 to 65° C. is 70 to 100 kpa and biaxial strain rate of the base fabric at that time is 2.9 to 4.0%. Preferably, a yarn which constitutes the woven fabric is Nylon 66 fiber, content of an oil component remaining in the woven fabric is 0.04 to 0.60% by weight to the woven fabric, main ingredient of the oil component is an olefin type polymer having a melting point of 60° C. or lower, and the woven fabric contains 20 to 200 ppm of a phosphorus component.

6 Claims, 1 Drawing Sheet

(51) Int. Cl.
*D06M 15/227* (2006.01)
*B60R 21/239* (2006.01)
*D03D 15/00* (2006.01)
*D03D 13/00* (2006.01)
*D06M 101/34* (2006.01)

(52) U.S. Cl.
CPC ............ *D03D 13/008* (2013.01); *D03D 15/00* (2013.01); *D06M 15/227* (2013.01); *B60R 2021/23509* (2013.01); *D06M 2101/34* (2013.01); *D06M 2200/40* (2013.01); *D10B 2331/02* (2013.01); *D10B 2505/124* (2013.01); *Y10T 442/30* (2015.04); *Y10T 442/3065* (2015.04)

(56) References Cited

FOREIGN PATENT DOCUMENTS

| JP | 2002-220777 A | 8/2002 |
| JP | 2003-165407 A | 6/2003 |
| JP | 2011-131874 A | 7/2011 |
| JP | 2011-168938 A | 9/2011 |
| JP | 2012-052280 A | 3/2012 |

OTHER PUBLICATIONS

International Search Report dated Aug. 20, 2013, issued in corresponding application No. PCT/JP2013/062897.

* cited by examiner

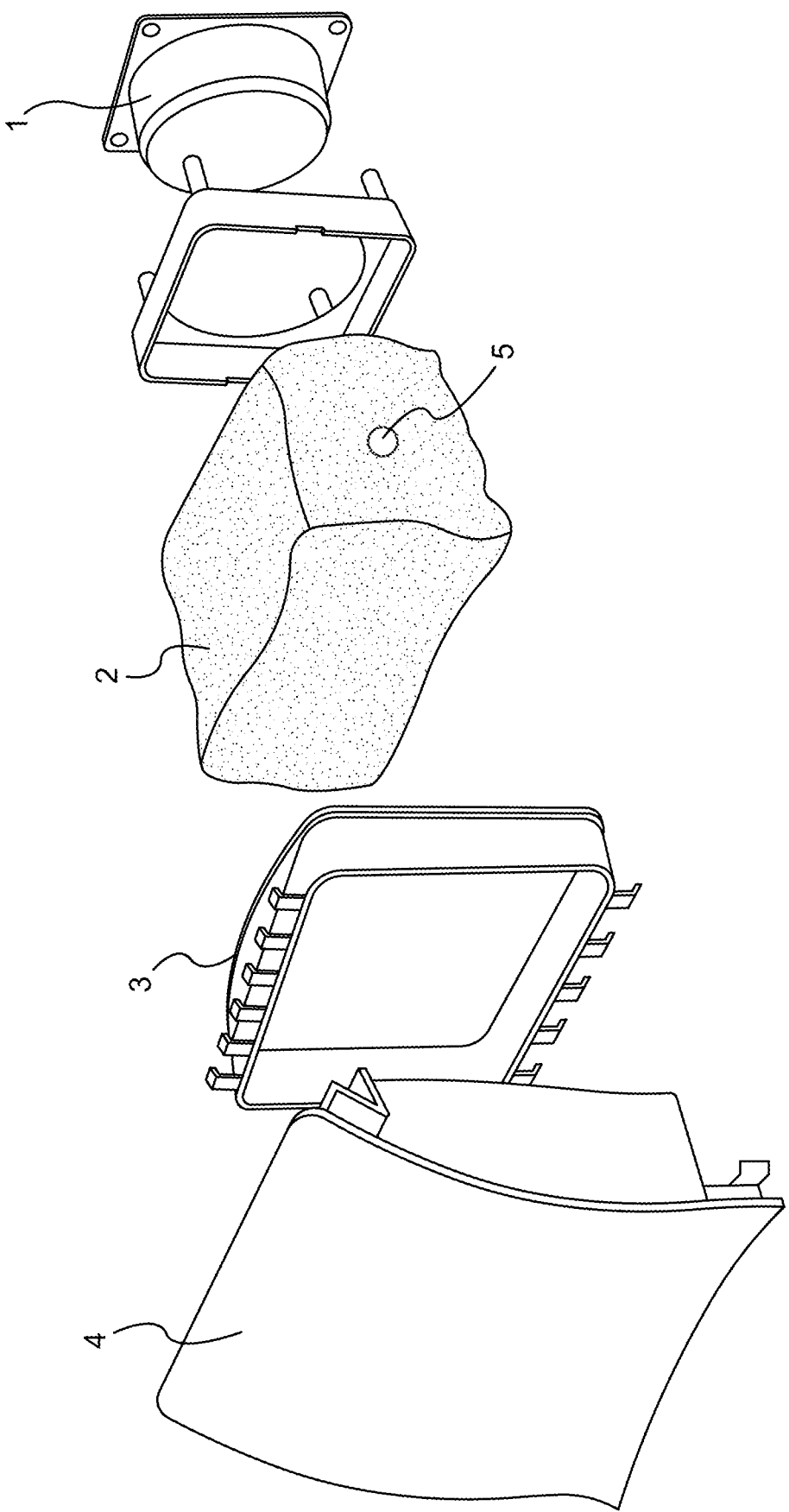

BASE FABRIC FOR AIR BAG WHICH HARDLY CAUSES "BOTTOMING" UPON COLLISION

TECHNICAL FIELD OF THE INVENTION

The present invention relates to a non-coated base fabric for air bag which prevents persons in a car from colliding with a steering wheel or a dashboard upon car crash, and which is particularly suitable for a driver seat and a passenger seat.

BACKGROUND ART

An air bag has been quickly increasing in its installing rate in recent years as one of the safety parts for cars. The air bag is used for such a purpose that, in car crash, a sensor perceives the shock, gas of high temperature and high pressure is generated from an inflator and the air bag is quickly developed by the gas whereby the collision of the bodies or, particularly, the heads of a driver and a passenger to steering wheel, windshield, door glass, etc. is prevented and protected. At present, not only an air bag for a driver seat and a passenger seat coping with the collision from the front side of a car but also a knee air bag which protects the knee, a side air bag or a side curtain air bag which copes with the collision from the lateral side and an air bag which is provided for collision from back side have been adopted. Further, in recent years, an air bag which protects a collided pedestrian has been also known and the using sites of air bags have been steadily increasing now.

While production amounts of air bags are increasing, simplification of an inflator which is combined therewith so as to form an air bag module has been in progress for lowering the cost. As to an inflator, there have been known the so-called stored gas inflator wherein a plug of a metal container in which inert gas such as helium is sealed at high pressure is destroyed by gunpowder so that the gas is released therefrom; the so-called hybrid inflator wherein the gas filled in a relatively small amount is warmed by heat of combustion of gunpowder and the gas generated from gunpowder is combined with the filled gas; and a simple inflator called a pyro-inflator wherein gunpowder which is a gas generator in a solid form is burned. Recently, switching to the pyro-inflator has been in progress.

The pyro-inflator can be made into small size and light weight but, there are a lot of incomplete combustion products generated from gunpowder and floating microparticles due to the residue after combustion of gunpowder. Therefore, temperature of the gas flown into an air bag is higher than that in the conventional inflator and thermal load to a base fabric for air bag is high. Particularly in the so-called impactor evaluation (a method wherein a thing is collided with a developing air bag and the moved distance of the thing is evaluated), the moved distance of a thing is long in the case of an air bag using the conventionally used base fabric for air bag whereby there sometimes happens a phenomenon called "bottoming" (a phenomenon wherein the thing collides with a joining part of a base fabric for air bag).

Up to now, as to an index for succeeding in the impactor evaluation, air permeability of a woven fabric is adopted and it has been common that a base fabric having a low air permeability succeeds in the evaluation (refer to Patent Documents 1 and 2). With regard to air permeability, there have been known the so-called static air permeability in which the air permeability is measured with a constant differential pressure and the so-called dynamic air permeability in which inner pressure and deformed amount of a base fabric changing every moment are measured upon instant application of compressed air to the base fabric. In any of those methods, measurement is carried out at ordinary room temperature. However, in the recent air bag used in combination with a pyro-inflator, it is not always true that a base fabric for air bag having low air permeability at ordinary room temperature (i.e. a base fabric exhibiting high inner pressure as an air bag at ordinary room temperature) succeeds in the impactor evaluation.

It goes without saying that, when an air bag is made of a silicone-coated fabric, it does not fail in the impactor test even if it is used in combination with a pyro-inflator. However, a silicone-coated fabric lacks lightness and compactness and, in view of interior design in a car, such a one is a bit difficult to be used for the areas demanding the compactness such as a driver seat and a passenger seat. Therefore, a non-coated fabric has been still preferably used.

On the other hand, investigations for measures for high temperature inflator gas have been partially carried out as well. As one of them, investigation for a sewn portion of an air bag is also being carried out. However, even in this investigation, no evaluation at high temperature has been conducted and there is a problem that the measure for a pyro-inflator which has been used recently is difficult (refer to Patent Document 3).

PRIOR ART DOCUMENTS

Patent Documents

Patent Document 1: Japanese Patent Application Laid-Open (JP-A) No. 2003-165407
Patent Document 2: Japanese Patent Application Laid-Open (JP-A) No. 2002-220777
Patent Document 3: Japanese Patent Application Laid-Open (JP-A) No. 2011-131874

BRIEF DESCRIPTION OF THE DRAWINGS

FIG. 1 is an illustrative view showing an air bag module according to an embodiment of the present invention.

DISCLOSURE OF THE INVENTION

Problem that the Invention is to Solve

An object of the present invention is to solve the above-mentioned conventional problems. To be more specific, it is to provide a non-coated base fabric for air bag which can be used without problem even for pyro-inflators as well.

Means for Solving the Problem

A base fabric for air bag according to the present invention comprises the following constitutions (1) to (6):

(1) A non-coated base fabric for air bag characterized in that maximum value of inner pressure of a woven fabric in measurement of dynamic air permeability at 50 to 65° C. is 70 to 100 kpa and biaxial strain rate of the base fabric at that time is 2.9 to 4.0%.

(2) The non-coated base fabric for air bag according to (1), wherein a yarn which constitutes the woven fabric is Nylon 66 fiber, single yarn fineness of the yarn is 1 to 4 dtex, filament number of the yarn is 80 to 300 and cover factor of the woven fabric is 2000 to 2300.

(3) The non-coated base fabric for air bag according to (1) or (2), wherein content of an oil component remaining in the woven fabric is 0.04 to 0.60% by weight to the woven fabric and main ingredient of the oil component is an olefin type polymer having a melting point of 60° C. or lower.

(4) The non-coated base fabric for air bag according to any of (1) to (3), wherein the woven fabric contains 20 to 200 ppm of a phosphorus component.

(5) A module for air bag characterized in that it is manufactured by combining a bag-shaped product with a pyro-inflator, wherein the bag-shaped product has been formed by cutting and sewing the non-coated base fabric for air bag mentioned in any of (1) to (4) followed by further forming at least one vent hole.

(6) A method for manufacturing a non-coated base fabric for air bag mentioned in any of (1) to (4) characterized in that, in a preparation step for weaving the woven fabric, an olefin type oil is applied at least to warps.

Advantages of the Invention

The base fabric for air bag according to the present invention has such a characteristic that, since it is a non-coated fabric, it is excellent in terms of lightweight and compactness and that, even at high temperature state, the inner pressure of an air bag can be easily retained. Therefore, the base fabric for air bag according to the present invention is excellent in terms of an impactor characteristic to pyro-inflator and is particularly suitable for a driver seat and a passenger seat.

BEST MODE FOR CARRYING OUT THE INVENTION

Hereinafter, the base fabric for air bag in accordance with the present invention will be illustrated in detail.

With regard to the synthetic fiber used for the base fabric of the present invention, there is no particular limitation for its material. For example, aliphatic polyamide fiber such as Nylon 66, Nylon 6, Nylon 46 or Nylon 12; aromatic polyamide fiber such as aramid fiber; and polyester fiber such as polyethylene terephthalate, polytrimethylene terephthalate or polybutylene terephthalate can be used. Besides the above, all-aromatic polyester fiber, ultrahigh molecular polyethylene fiber, poly-p-phenylenebenzobisoxazole fiber (PBO fiber), polyphenylene sulfide fiber, polyether ketone fiber, etc. can be used. However, when economy is taken into consideration, polyester fiber and polyamide fiber are particularly preferred. Among them, Nylon 66 comprising a polyhexamethylene adipamide fiber is particularly preferred in view of its durability against high temperature gas.

Relative viscosity of Nylon 66 by sulfuric acid is preferred to be 3.2 to 4.0. Lower limit of the relative viscosity is more preferably 3.3 or more and, still more preferably, 3.4 or more. Upper limit of the relative viscosity is more preferably 3.6 or less and, still more preferably, 3.5 or less. When the relative viscosity is less than the above range, inner pressure of a woven fabric in measurement of dynamic air permeability under the high temperature state is apt to become low. When the relative viscosity is more than that, not only the cost for polymerization is apt to become high but also the operation of spinning is apt to become bad.

It is preferred that Nylon 66 contains 20 ppm or more phenylphosphonic acid or a metal salt thereof as a phosphorus component to the weight of the polymer. In general, phenylphosphonic acid or the like has been used as a polymerization catalyst. The present inventors have found that, in a woven fabric using a fiber containing phenylphosphonic acid or the like, the inner pressure in measurement of dynamic air permeability under the high temperature state is apt to become high. In such a woven fabric, it is likely that a phosphorus component has a suppressing effect for cleavage of a molecular chain under a high temperature state and the molecular chain is hardly cleaved and accordingly that the mutual intertwining of molecular chains is maintained and the yarn is hardly extended. In addition, it is also predicted that a reaction is resulted due to the heat generated by a pyro-inflator and to the presence of a phosphorus component whereby a molecular chain becomes long and it is also likely that the molecular chain cleavage under the high temperature state during development and the reaction of making the molecular chain long are concerted. Amount of the phosphorus component contained therein is preferred to be 40 ppm or more, more preferred to be 60 ppm or more, and further preferred to be 80 ppm or more. However, when the phosphorus component is too much, an after-polymerization proceeds in a spinning stage whereby gelling may happen and operability of the spinning may become bad. Amount of the phosphorus component contained therein is preferred to be 200 ppm or less, more preferred to be 160 ppm or less, and further preferred to be 150 ppm or less. As to a method for the production of Nylon 66 containing phenylphosphonic acid or a metal salt thereof, it is possible at the stage of a solution polymerization that phenylphosphonic acid or a metal salt thereof is added thereto or that phenylphosphinic acid or a metal salt thereof is added thereto. Phenylphosphinic acid or a salt thereof is oxidized during the step and is converted to phenylphosphonic acid or a salt thereof.

Difference between the carboxyl terminal group concentration and the amino terminal group concentration of Nylon 66 is preferred to be 25 milli-equivalents or less per kg of a polymer. When the difference between the terminal group concentrations is too big, inner pressure of the woven fabric in measurement of dynamic air permeability under the high temperature state due to the heat generated by a pyro-inflator is apt to become low. The difference between the terminal group concentrations is more preferred to be 1 to 23 milli-equivalents per kg of a polymer and further preferred to be 2 to 20 milli-equivalents per kg of a polymer. When the difference between the terminal group concentrations is made within such a range, it is also predicted that the reaction due to the presence of a phosphorus component is resulted and the molecular chain becomes long and accordingly that a decrease in the inner pressure can be prevented. When the difference between the terminal group concentrations is out of this range or, for example, when the amino terminal group concentration is higher, a tertiary amine is apt to be produced during melting and, as a result, operability for the spinning is apt to become bad.

As to Nylon 66, it is preferable that no terminal sequestering agent such as monoamine or monocarboxylic acid is used. When a terminal sequestering agent is used, effect of a phosphorus catalyst is apt to become low.

With regard to a part of the above characteristics of Nylon 66 polymer, although there have been examples wherein yellow-turning coloration, gel generation and fatigue resistance are investigated, no finding for controlling the air permeability as a woven fabric to an instant high temperature gas has been achieved up to now.

Single yarn fineness of the yarn which constitutes the woven fabric of base fabric for air bag according to the present invention is preferred to be 1 to 4 dtex. It is more preferred to be 2 to 3.8 dtex and further preferred to be 2.2 to 3.5 dtex. When the single yarn fineness is more than the above range, inner pressure in measurement of dynamic air permeability is apt to become low. When the single yarn fineness is less than the above range, productivity of the fiber is apt to be deteriorated.

Filament number of the yarn constituting the woven fabric of base fabric for air bag according to the present invention is preferred to be 80 to 300. It is more preferred to be 100 to 250 and further preferred to be 130 to 200. When the filament number is less than the above range, not only the package ability is apt to become bad but also the inner pressure in measurement of dynamic air permeability is apt to become low. When the filament number is more than the above range, productivity of the fiber is apt to become bad.

Further, in the fiber as such, a part of or all of it may be produced from a recycled raw material. In the synthetic fibers as such, various kinds of additives may be contained therein for a purpose of enhancing the step passing property in the manufacturing step for starting yarn or the after-processing step. Examples of the additive used therefor include antioxidant, thermostabilizer, flattening/smoothening agent, antistatic agent, thickener and flame retardant. Further, the synthetic fiber may be a dope-dyed yarn or a yarn which is dyed after filature. Furthermore, the cross section of the single yarn of the synthetic fiber may be not only the ordinary round cross section but also the differently shaped cross section. In view of breaking strength and elongation at breakage, etc., the synthetic fiber is preferred to be used as multi-filament yarn for weaving.

As to the base fabric for air bag according to the present invention, it is preferred to be a woven fabric in which a cover factor (CF) calculated by the following formula is 2000 to 2300. The cover factor is more preferred to be 2050 to 2200. When the cover factor is more than the above range, compactness is apt to become bad. When the cover factor is less than the above range, inner pressure in measurement of dynamic air permeability is apt to become low.

CF=[(density of warp(warp number/2.54 cm))×√/
(fineness of warp (dtex)×0.9)]+[(density of woof
(woof number/2.54 cm))×√/(fineness of woof
(dtex)×0.9)]

In the woven fabric which is a base fabric for air bag according to the present invention, maximum value of inner pressure in measurement of dynamic air permeability at the high temperature of 50 to 65° C. is 70 to 100 kpa and biaxial strain rate of the base fabric at that time is 2.9 to 4.0%. The dynamic air permeability under the high temperature state is upon a presumption of development using an inflator. When the inner pressure at that time is lower than 70 kpa, the base fabric is usable only for an air bag having specific size and shape whereby that is not preferred. The inner pressure is more preferred to be 72 kpa or more, further preferred to be 73 kpa or more, and particularly preferred to be 75 kpa or more. When the inner pressure is higher than 100 kpa, not only the weight of the base fabric becomes heavy whereby the compactness lowers but also the productivity becomes bad whereby the cost becomes high.

The biaxial strain rate of the base fabric when it shows the maximum value of inner pressure in measurement of dynamic air permeability is an index showing the deformability of the woven fabric in case the pressure is generated. When the value becomes more, it indicates that the woven fabric is more deformable. When this value is more than 4.0%, the developing behavior of an air bag made of the base fabric is apt to become unstable whereby that is not preferred. On the contrary, when the value is less than 2.9% (that is, when the woven fabric is hardly deformable), it is presumed to be either a base fabric having bad property of keeping the inner pressure or a strong base fabric which is not deformed by pressure. In any case, the developing behavior of an air bag made of the base fabric is apt to become unstable whereby that is not preferred. The biaxial strain rate is preferred to be 3.0 to 4.0%, more preferred to be 3.1 to 4.0%, and further preferred to be 3.2 to 4.0%. Besides the means of controlling the woven density and the single yarn fineness, the biaxial strain rate can be also controlled when appropriate amount of an oil or, particularly, an olefin type oil is adhered onto the surface of a woven fabric.

Amount of the oil component remaining in a woven fabric which is a base fabric for air bag according to the present invention is preferred to be 0.04 to 0.60% by weight to the woven fabric. When the oil component is less than 0.04% by weight, the inner pressure in measurement of dynamic air permeability under the high temperature state is apt to become low. There will be two reasons therefor. One is an effect of decreasing the friction coefficient between fiber and fiber and another is a film effect due to the use of an oil having a relatively low melting point. When content of the oil component is made 0.04% by weight or more, friction coefficient between fiber and fiber decreases whereby the fiber and the filament which constitute the woven fabric move relatively freely and move in the direction of filling the gap in the woven fabric and, as a result, inner pressure in measurement of dynamic air permeability can be made high. In addition, when the oil has a melting point of 60° C. or lower, the oil melts by heat when high temperature gas from an inflator hits the fabric and the oil moves in the direction of filing the gap in the woven fabric and covers the woven fabric surface whereby the inner pressure in measurement of dynamic air permeability can be made high. In view of the above, although there is no particular limitation for the oil so far as it has a melting point of 60° C. or lower, it is preferred, in taking the step of oil application into consideration, to be such an oil which has an emulsion form during application, decreases the friction coefficient between fiber and fiber after application, exists in a solid state at ordinary room temperature and melts when high temperature gas from an inflator hits the fabric. In the commonly known spinning oil or warping oil such as acrylic type oil or ester type oil, there has been known nothing which fulfills the above property. In the present invention, an olefin type oil is preferably used. The adhering amount of the oil to the woven fabric is more preferred to be 0.06 to 0.50% by weight, and further preferred to be 0.07 to 0.40% by weight. When the adhering amount of the oil is more than 0.60% by weight, combustibility is apt to increase.

There is no particular limitation for a method of applying an oil but it may be applied either as a spinning oil or as a warping oil after application of a spinning oil having a different composition. It is also possible that an oil in a predetermined amount is applied by means of dipping or coating during the after-treatment of the fabric.

Although there is no particular limitation for a method of weaving a woven fabric which is a base fabric for air bag according to the present invention, a plain weaving is preferred when uniformity of the properties of the woven fabric is taken into consideration. In the yarn used therefor, warp and woof may not be the same and there is no problem at all even when they are different, for example, in their size, yarn number and fiber type. In a preparation step for weaving the woven fabric, it is preferred to apply the olefin type oil at least to warps. Effect of the olefin type oil has been mentioned already. As to a method for application, although there is a method for applying the oil as a spinning oil, such a method is less efficient because the oil is apt to be detached particularly when the weaving is conducted by means of water jets. When the adhesion is tried using a spinning oil, the oil component is apt to be separated out onto a heating roller during the spinning whereby a cleaning therefor is necessary resulting in worsening of the productivity.

It is preferred that the woven fabric which is a base fabric for air bag according to the present invention is subjected to a thermal setting at the temperature of 160° C. or higher together with applying the tension of 200 N/m or more in the warp direction after the weaving. When the tension in the warp direction at the high temperature setting is less than 200 N/m, quality of the woven fabric is apt to become bad whereby that is not preferred. When it is more than 800 N/m, shrinking rate is apt to become high whereby that is not preferred. The tension in the warp direction at the high temperature setting is more preferred to be 300 to 600 N/m. Further, when the temperature for the thermal setting is lower than 160° C., shrinking rate is apt to become high whereby that is not preferred while, when it is higher than 230° C., the woven fabric is apt to be discolored whereby that is not preferred. The temperature for the thermal setting is more preferred to be 180 to 210° C. Although there is no particular limitation for the treating time for the thermal setting, it is preferred to be 10 seconds to 10 minutes, more preferred to be 30 seconds to 5 minutes, and further preferred to be 1 minute to 3 minutes.

At high temperature, air permeation from the surface of woven fabric is apt to become large in the common base fabric. In addition, the amount of the permeated air is also hard to be controlled since the base fabric temperature varies due to imbalance of the amount of gunpowder of an inflator. On the contrary, in the base fabric for air bag according to the present invention, gas hardly permeates even under the high temperature state and the gas which did not permeate can be induced into a hole which is called a vent hole formed in the air bag. Therefore, in the case of settlement of the impactor characteristic, it can be controlled by the size of a vent hole whereby the bottoming hardly happens. Accordingly, the present invention is most suitable for a combination of the base fabric for air bag having a vent hole with the pyro-inflator being used advantageously as an air bag for a driver seat and a passenger seat.

The module according to the present invention is constituted from an air bag which is a bag-shaped product 2 (cover subassembly) and an inflator 1 (reaction device subassembly). The air bag can be housed inside a housing 3, for example, inside a steering wheel cover 4. Usually, an air bag which is a bag-shaped product 2 having a hole 5 on a part thereof is equipped with an inflator 1. The bag-shaped air bag 2 is compactly accommodated either by being folded or by making round. Since the base fabric of the present invention can maintain the high inner pressure at high temperature, it can be advantageously combined particularly with a pyro-inflator which generates high temperature gas. The air bag of the present invention needs to appropriately absorb the shock upon impact due to its characteristic of holding the inner pressure at high temperature. Accordingly, the air bag of the present invention is preferred to be made into a bag-shaped product having at least one vent hole. When the vent hole number increases, the developing property can be hardly controlled and the cutting thereof also becomes complicated. Accordingly, the number of vent holes is preferred to be four or less. When the developing stability is taken into consideration, two vent holes are most preferred.

EXAMPLES

As hereinafter, the present invention will now be illustrated in more detail. Incidentally, various evaluations in Examples were measured according to the following methods:

(1) Measurement of Phosphorus Component in Woven Fabric

The woven fabric was cut into about 40 mm square using scissors made of stainless steel, layered into a sufficient thickness and analyzed by X-ray fluorescence method using Rigaku ZSX 100e (4.0 kW Rh Tube) manufactured by Rigaku Corporation. Diameter to be measured was set to 30 mm and the phosphorus component in the woven fabric was quantified by a fundamental parameter method.

(2) Relative Viscosity by Sulfuric Acid

The woven fabric after extraction of the oil component by a Soxhlet method was used as a specimen. The specimen was dissolved in 96.3±0.1% by weight of concentrated sulfuric acid (special reagent grade) for making the specimen concentration 10 mg/ml to prepare a sample solution. The relative viscosity of the solution was measured at the temperature of 20° C.±0.05° C. using an Ostwald viscometer with the water dropping time of 6 to 7 seconds. The relative viscosity (RV) was calculated using the following formula from the dropping time T0 (in second(s)) of the same sulfuric acid as that used for preparing the sample solution and the dropping time T1 (in second(s)) of 20 ml of the sample solution using the same viscometer in the measurement:

$$RV = T1/T0$$

Incidentally, the Soxhlet method was done in accordance with the measuring method for the adhered amount of the oil component mentioned in this specification.

(3) Concentration of Amino Terminal Group and Concentration of Carboxyl Terminal Group Measurement of $^1$H-NMR was conducted at the resonance frequency of 500 MHz using "Advance 500" which is an NMR apparatus manufactured by Bruker. A specimen was prepared by dipping for one night in chloroform followed by drying. A method for preparing the solution for the measurement is that 0.6 ml of a 1:1 by volume mixture of heavy benzene and hexafluoro-isopropanol was produced (or prepared) as a solvent and about 15 mg of a specimen was dissolved therein together with stirring for 30 minutes or longer. To this solution was added 20 μl of a solution containing 0.2 mol/liter concentration of triethylamine to heavy chloroform followed by stirring for 5 minutes. This solution was filled in a sample tube of 5 mm diameter and the measurement was conducted at room temperature. Integrated number was made 128 times.

Quantitative determination of concentration of the terminal group was conducted as follows. Thus, when peak of methylene group at α-position of carbonyl group of Nylon 66 is made 1.95 ppm, then a peak at 2.43 to 2.55 ppm is for amino terminal group and a peak at 2.20 to 2.28 ppm is for carboxyl terminal group. Terminal group amount was calculated from the integral peak values of each terminal group to the total integral value for 1.85 to 2.15 ppm. When integral value for amino terminal group was A, integral value for carboxyl terminal group was B and total integral value for 1.85 to 2.15 ppm or, in other words, integral value of methylene group at α-position of carbonyl group of Nylon 66 was C, then each of the amino terminal group amount and the carboxyl terminal group amount was calculated according to the following formula:

$$\text{amino terminal group amount (eq/t)} = (A \times 4000000)/(452 \times C)$$

$$\text{carboxyl terminal group amount (eq/t)} = (B \times 4000000)/(452 \times C)$$

(4) Fineness of Yarn

Fineness based on corrected weight was measured at the predetermine load of 0.045 cN/dtex according to a method 8.3.1A of JIS L 1013 (1999) and adopted as the total fineness.

(5) Single Yarn Number

Single yarn number was calculated according to a method 8.4 of JIS L 1013 (1999).

(6) Adhered Amount of Oil Component

A woven fabric specimen (10 g) was subjected to a Soxhlet extraction for 4 hours with 120 ml of n-hexane. Amount of oil component in the specimen (% by weight) was determined from the evaporated/dried weight of the extract with n-hexane.

(7) Dynamic Air Permeability at High Temperature

A woven fabric (20 cm×20 cm) was allowed to stand in an oven of 180° C. for about one minute. Then it was taken out from the oven and, within one minute, its dynamic air permeability was measured. Average temperature within a range of 3.5 cm radius from the center of the woven fabric at that time was within a range of 50 to 65° C. Dynamic air permeability was measured by FX 3350 manufactured by TEXTEST AG under the filled pressure of 225 kpa and the filled volume of 200 cc. Measured data obtained from an inner pressure sensor and a strain amount detector were taken up into a computer in which an analysis software for an L5110 evaluation program Labodata II (manufactured by TEXTEST AG) was installed and then the maximum value of inner pressure and the biaxial strain rate were specified. When temperature of the woven fabric immediately after the measurement was lower than 50° C., the measurement was tried again. The measurement was carried out in a chamber controlled under the environment of 20° C. and 65% RH. The "temperature of the woven fabric immediately after the measurement" was confirmed by directly taking the picture of the fabric from the lower part of the device of Theama CAM SC 640 manufactured by Flir System used therefor.

Example 1

Copper iodide and potassium iodide were added to Nylon 66 polymer chip which contains 120 ppm of phenylphosphonic acid in terms of phosphorus element and which contains no sequestered terminal. Then a solid phase polymerization was conducted to give a polymer. The obtained polymer was discharged from a heated spinning nozzle using a known method and a spinning oil of a fatty acid ester type was applied thereto followed by stretching. There was prepared Nylon 66 fiber (470 dtex, 144 filaments) having relative viscosity of 3.3 and difference between carboxyl terminal group concentration and amino terminal group concentration of 14 milli-equivalents per kg of the polymer.

During warping, 0.2% by weight of "Afterwax 300" which was an olefin type oil manufactured by Matsumoto Yushi Seiyaku was applied to the fiber, then weaving was conducted in a water jet loom and treatment with hot water and drying treatment were conducted by means of known method to give a plain-woven fabric having weaving density for warp and woof directions of 53 yarns/inch. Properties of the resulting base fabric are shown in Table 1. Even at high temperature, its maximum value of the inner pressure in measurement of dynamic air permeability was high and it was a non-coated woven fabric suitable for a pyro-inflator.

Example 2

Copper iodide and potassium iodide were added to Nylon 66 polymer chip which contains 62 ppm of phenylphosphonic acid in terms of phosphorus element and which contains no sequestered terminal. Then a solid phase polymerization was conducted to give a polymer. The obtained polymer was discharged from a heated spinning nozzle using a known method and a spinning oil of a fatty acid ester type was applied thereto followed by stretching. There was prepared Polyamide 6.6 fiber (350 dtex, 144 filaments) having relative viscosity of 3.5 and difference between carboxyl terminal group concentration and amino terminal group concentration of 15 milli-equivalents per kg of the polymer. During warping, 0.3% by weight of "Softwax 75" which was an olefin type oil manufactured by Matsumoto Yushi Seiyaku was applied to the fiber, then weaving was conducted in a water jet loom. After the fabric was scoured, its width direction was fixed at an elongation of 0% and thermal setting was done at 190° C. together with application of tension of 400 N/m in a warp direction to give a plain-woven fabric having weaving density for warp and woof directions of 57 yarns/inch. Properties of the resulting base fabric are shown in Table 1. Although its biaxial strain was relatively big, its maximum value of inner pressure in measurement of dynamic air permeability was high even at high temperature and it was a non-coated woven fabric suitable for a pyro-inflator.

Example 3

A base fabric was prepared according to the method of Example 1 except that, as shown in Table 1, Nylon 66 contained 45 ppm of phenylphosphonic acid in terms of phosphorus element, relative viscosity was 3.2, difference between carboxyl terminal group concentration and amino terminal group concentration was 17 milli-equivalents per kg of polymer, weaving density was 51 yarns/inch and adhered amount of oil was 0.07% by weight. Properties of the resulting base fabric are shown in Table 1. Although its maximum value of inner pressure in measurement of dynamic air permeability at high temperature was low as compared with Examples 1 and 2, it was a non-coated woven fabric suitable for a pyro-inflator.

Example 4

A base fabric was prepared according to the method of Example 2 except that, as shown in Table 1, relative viscosity was 3.4, single yarn number was 108, single yarn fineness was 3.2 dtex, weaving density was 59 yarns/inch for both warp and woof directions, adhered amount of oil was 0.21% by weight, and thermal setting was not conducted. Properties of the resulting base fabric are shown in Table 1. Its maximum value of inner pressure in measurement of dynamic air permeability was high even at high temperature and it was a non-coated woven fabric suitable for a pyro-inflator.

Example 5

A base fabric was prepared according to the method of Example 2 except that, as shown in Table 1, relative viscosity was 3.4, weaving density was 61 yarns/inch for both warp and woof directions, adhered amount of oil was 0.05% by weight, and thermal setting was not conducted. Properties of the resulting base fabric are shown in Table 1. Although its biaxial strain was relatively big, its maximum value of inner pressure in measurement of dynamic air permeability was high even at high temperature and it was a non-coated woven fabric suitable for a pyro-inflator.

Example 6

A base fabric was prepared according to the method of Example 1 except that, as shown in Table 1, weaving density was 49 yarns/inch for both warp and woof directions, oil was "Softwax 75" manufactured by Matsumoto Yushi Seiyaku, and adhered amount of oil was 0.35% by weight. Properties of the resulting base fabric are shown in Table 1. Although its maximum value of inner pressure in measurement of dynamic air permeability at high temperature was relatively low, its biaxial strain was small and it was a non-coated woven fabric suitable for a pyro-inflator.

Example 7

A base fabric was prepared according to the method of Example 3 except that, as shown in Table 1, fineness of yarn was 270 dtex, single yarn number was 84, single yarn fineness was 3.2 dtex, weaving density was 69 yarns/inch for both warp and woof directions, oil was "Softwax 75" manufactured by Matsumoto Yushi Seiyaku, and adhered amount of oil was 0.81% by weight. Properties of the resulting base fabric are shown in Table 1. Although its biaxial strain was relatively big, its maximum value of inner pressure in measurement of dynamic air permeability was extremely high even at high temperature and it was a non-coated woven fabric suitable for a pyro-inflator.

Example 8

A base fabric was prepared according to the method of Example 2 except that, as shown in Table 1, Nylon 66 contained 25 ppm of phenylphosphonic acid in terms of phosphorus element, relative viscosity was 3.1, difference between carboxyl terminal group concentration and amino terminal group concentration was 19 milli-equivalents per kg of polymer, fineness of yarn was 400 dtex, single yarn number was 108, single yarn fineness was 3.7 dtex, and thermal setting was not conducted. Properties of the resulting base fabric are shown in Table 1. Although its biaxial strain was relatively big, its maximum value of inner pressure in measurement of dynamic air permeability at high temperature was high and it was a non-coated woven fabric suitable for a pyro-inflator.

Comparative Example 1

Copper iodide and potassium iodide were added to Nylon 66 polymer chip which contains no phenylphosphonic acid and which contains terminals sequestered by acetic acid. Then a solid polymerization was conducted to give a polymer. The obtained polymer was discharged from a heated spinning nozzle using a known method and a spinning oil of a fatty acid ester type was applied thereto followed by stretching. There was prepared Polyamide 6.6 fiber (470 dtex, 144 filaments) having relative viscosity of 3.2 and difference between carboxyl terminal group concentration and amino terminal group concentration of 31 milli-equivalents per kg of the polymer. During warping, 0.2% by weight of "Softwax 75" which was an olefin type oil manufactured by Matsumoto Yushi Seiyaku was applied to the fiber, then weaving was conducted in a water jet loom. After the fabric was scoured, its width direction was fixed at an elongation of 0% and thermal setting was done at 240° C. together with application of tension of 150 N/m in a warp direction to give a plain-woven fabric having weaving density for warp and woof directions of 52 yarns/inch. Properties of the resulting base fabric are shown in Table 1. Its maximum value of inner pressure in measurement of dynamic air permeability at high temperature was low and it was a non-coated woven fabric which was not suitable for a pyro-inflator. Moreover, the woven fabric was tinged with yellowish color and the quality was inferior.

Comparative Example 2

A base fabric was prepared according to the method of Example 2 except that, as shown in Table 1, fineness of yarn was 470 dtex, single yarn number was 72, weaving density was 55 yarns/inch for both warp and woof directions, and adhered amount of oil was 0.05% by weight. Properties of the resulting base fabric are shown in Table 1. Its maximum value of inner pressure in measurement of dynamic air permeability at high temperature was low and it was a non-coated woven fabric which was not suitable for a pyro-inflator. Further, the texture was hard lacking in compactness as well.

Comparative Example 3

A base fabric was prepared according to a method of Example 3 except that, as shown in Table 1, a sizing agent of acrylic type was used instead of an olefin type oil and the sizing agent was applied to the woven fabric in an amount of 0.3% by weight. Properties of the resulting base fabric are shown in Table 1. Its maximum value of inner pressure in measurement of dynamic air permeability at high temperature was low and it was a non-coated woven fabric which was not suitable for a pyro-inflator.

TABLE 1

| | | Example 1 | Example 2 | Example 3 | Example 4 | Example 5 | Example 6 | Example 7 | Example 8 | Comparative Example 1 | Comparative Example 2 | Comparative Example 3 |
|---|---|---|---|---|---|---|---|---|---|---|---|---|
| Relative viscosity | | 3.3 | 3.5 | 3.2 | 3.4 | 3.4 | 3.3 | 3.2 | 3.1 | 3.2 | 3.5 | 3.2 |
| AEG terminal | milli-equivalents per kg of the polymer | 38 | 34 | 42 | 34 | 34 | 38 | 42 | 33 | 27 | 34 | 42 |
| CEG terminal | milli-equivalents per kg of the polymer | 52 | 49 | 59 | 49 | 49 | 52 | 59 | 52 | 58 | 49 | 59 |
| CEG-AEG | milli-equivalents per kg of the polymer | 14 | 15 | 17 | 15 | 15 | 14 | 17 | 19 | 31 | 15 | 17 |
| Terminal sequestering agent | | absent | absent | absent | absent | absent | absent | absent | absent | acetic acid | absent | absent |

TABLE 1-continued

| | | Example 1 | Example 2 | Example 3 | Example 4 | Example 5 | Example 6 | Example 7 | Example 8 | Comparative Example 1 | Comparative Example 2 | Comparative Example 3 |
|---|---|---|---|---|---|---|---|---|---|---|---|---|
| P compound | | phenyl-phosphonic acid | phenyl-phosphonic acid | phenyl-phosphonic acid | phenyl-phosphonic acid | phenyl-phosphonic acid | phenyl-phosphonic acid | phenyl-phosphonic acid | phenyl-phosphonic acid | absent | phenyl-phosphonic acid | phenyl-phosphonic acid |
| Content of P | ppm | 120 | 62 | 45 | 62 | 62 | 120 | 45 | 25 | 0 | 62 | 45 |
| Fineness of yarn | dtex | 470 | 350 | 470 | 350 | 350 | 470 | 270 | 400 | 470 | 470 | 470 |
| Single yarn number | | 144 | 144 | 144 | 108 | 144 | 144 | 84 | 108 | 144 | 72 | 144 |
| Single yarn fineness | dtex | 3.3 | 2.4 | 3.3 | 3.2 | 2.4 | 3.3 | 3.2 | 3.7 | 3.3 | 6.5 | 3.3 |
| Weaving density | number of yarns per inch | 53 | 57 | 51 | 59 | 61 | 49 | 69 | 57 | 52 | 55 | 51 |
| Cover factor | | 2180 | 2023 | 2098 | 2094 | 2282 | 2008 | 2151 | 2162 | 2139 | 2262 | 2098 |
| Adhered amount of oil | % | 0.15 | 0.25 | 0.07 | 0.21 | 0.05 | 0.35 | 0.81 | 0.25 | 0.03 | 0.05 | 0.25 |
| Main ingredient of oil | | olefin | olefin | olefin | olefin | olefin | olefin | olefin | olefin | olefin | olefin | acrylic |
| Melting point of oil component | °C. | 45 | 58 | 45 | 58 | 58 | 58 | 58 | 58 | 58 | 45 | |
| Peak pressure in measurement of dynamic air permeability (180° C. treatment) | kpa | 80 | 75 | 72 | 78 | 81 | 71 | 84 | 75 | 66 | 58 | 68 |
| Biaxial strain at peak pressure in measurement of dynamic air permeability (180° C. treatment) | % | 3.3 | 3.5 | 3.0 | 3.4 | 3.5 | 3.2 | 3.8 | 3.6 | 3.0 | 2.8 | 3.2 |
| Combustibility (FMVSS302) | | self-extinguishable | self-extinguishable | self-extinguishable | self-extinguishable | self-extinguishable | self-extinguishable | self-extinguishable | self-extinguishable | self-extinguishable | self-extinguishable | self-extinguishable |
| Setting tension | N/m | absent | 400 | absent | absent | absent | absent | absent | absent | 150 | 400 | 1000 |
| Setting temperature | °C. | absent | 190 | absent | absent | absent | absent | absent | absent | 240 | 190 | 150 |

INDUSTRIAL APPLICABILITY

The base fabric for air bag in accordance with the present invention is excellent in terms of its light weight and compactness and, further, it is apt to retain the inner pressure of an air bag even at high temperature. Accordingly, it is suitable particularly for a driver seat and a passenger seat and is excellent in impactor characteristics even in the case of being used in combination with a pyro-inflator.

The invention claimed is:

1. A non-coated base fabric for an air bag, comprising:
a base fabric, the base fabric being woven,
wherein a maximum value of an inner pressure of the woven fabric at a temperature of 50 to 65° C. is 70 to 100 kpa, and
wherein a biaxial strain rate of the woven fabric is 2.9 to 4.0% when the inner pressure of the woven fabric is 70 to 100 kpa.

2. The non-coated base fabric for the air bag according to claim 1,
wherein a yarn which constitutes the woven fabric is Nylon 66 fiber,
wherein a single yarn fineness of the yarn is 1 to 4 dtex,
wherein a filament number of the yarn is 80 to 300, and
wherein a cover factor of the woven fabric is 2000 to 2300.

3. The non-coated base fabric for the air bag according to claim 1, wherein a content of an oil component in the woven fabric is 0.04 to 0.60% by weight relative to the woven fabric, and a main ingredient of the oil component is an olefin type polymer having a melting point of 60° C. or lower.

4. The non-coated base fabric for the air bag according to claim 1, wherein the woven fabric contains 20 to 200 ppm of a phosphorus component.

5. A module for an air bag, comprising:
a bag-shaped product, and
a gyro-inflator,
the bag-shaped product being formed by cutting and sewing the non-coated base fabric for the air bag according to claim 1, followed by further forming at least one vent hole in the bag-shaped product.

6. A method for manufacturing a non-coated base fabric for the air bag according to claim 1, comprising:
in a preparation step for weaving the woven fabric, applying an olefin type oil at least to warps.

* * * * *